United States Patent [19]
Carpenter et al.

[11] Patent Number: 5,911,422
[45] Date of Patent: Jun. 15, 1999

[54] RECREATIONAL WHEELED ACCESSORY CARRIER

[76] Inventors: Jeff Carpenter, 724 Erie St.; Greg Carpenter, 148 Senica, both of Paramus, N.J. 07652

[21] Appl. No.: 08/941,635

[22] Filed: Oct. 2, 1997

[51] Int. Cl.⁶ .................................................. B62B 13/18
[52] U.S. Cl. .................................................. 280/8; 280/10
[58] Field of Search ............................ 280/8, 9, 10, 13, 280/43.11, 47.34, 47.35, 47.371, 11

[56] References Cited

U.S. PATENT DOCUMENTS

| | | |
|---|---|---|
| 4,505,489 | 3/1985 | Specie . |
| 4,589,668 | 5/1986 | Mares . |
| 4,618,157 | 10/1986 | Resnick . |
| 5,028,062 | 7/1991 | Pinnell et al. . |
| 5,285,656 | 2/1994 | Peters . |
| 5,306,029 | 4/1994 | Kaiser, II . |
| 5,407,218 | 4/1995 | Jackson . |
| 5,425,545 | 6/1995 | McCusker . |
| 5,492,347 | 2/1996 | Palmeri et al. . |
| 5,620,191 | 4/1997 | Sagette ........................ 280/8 |

Primary Examiner—Richard M. Camby
Attorney, Agent, or Firm—Terrance L. Siemens

[57] ABSTRACT

A wheeled carrier suitable for carrying diverse articles on sandy terrain. The carrier has a body forming an upwardly open principal cargo receptacle, a closed second receptacle, upwardly oriented openings for carrying cups, horizontally disposed tubular openings for carrying rolled papers and the like, external pockets formed from flexible material, a collapsible carrying rack, and a collapsible towing handle. The principal receptacle has a seat belt for securing a child therein. The carrier has four wheels supported on brackets and axles suspended beneath the body. Each wheel has an associated skid pivotally supported on the axle supporting its associated wheel. Each skid is configured in the manner of a ski, for assisting the carrier in negotiating ridges and similar obstructions present in sandy terrain.

11 Claims, 3 Drawing Sheets

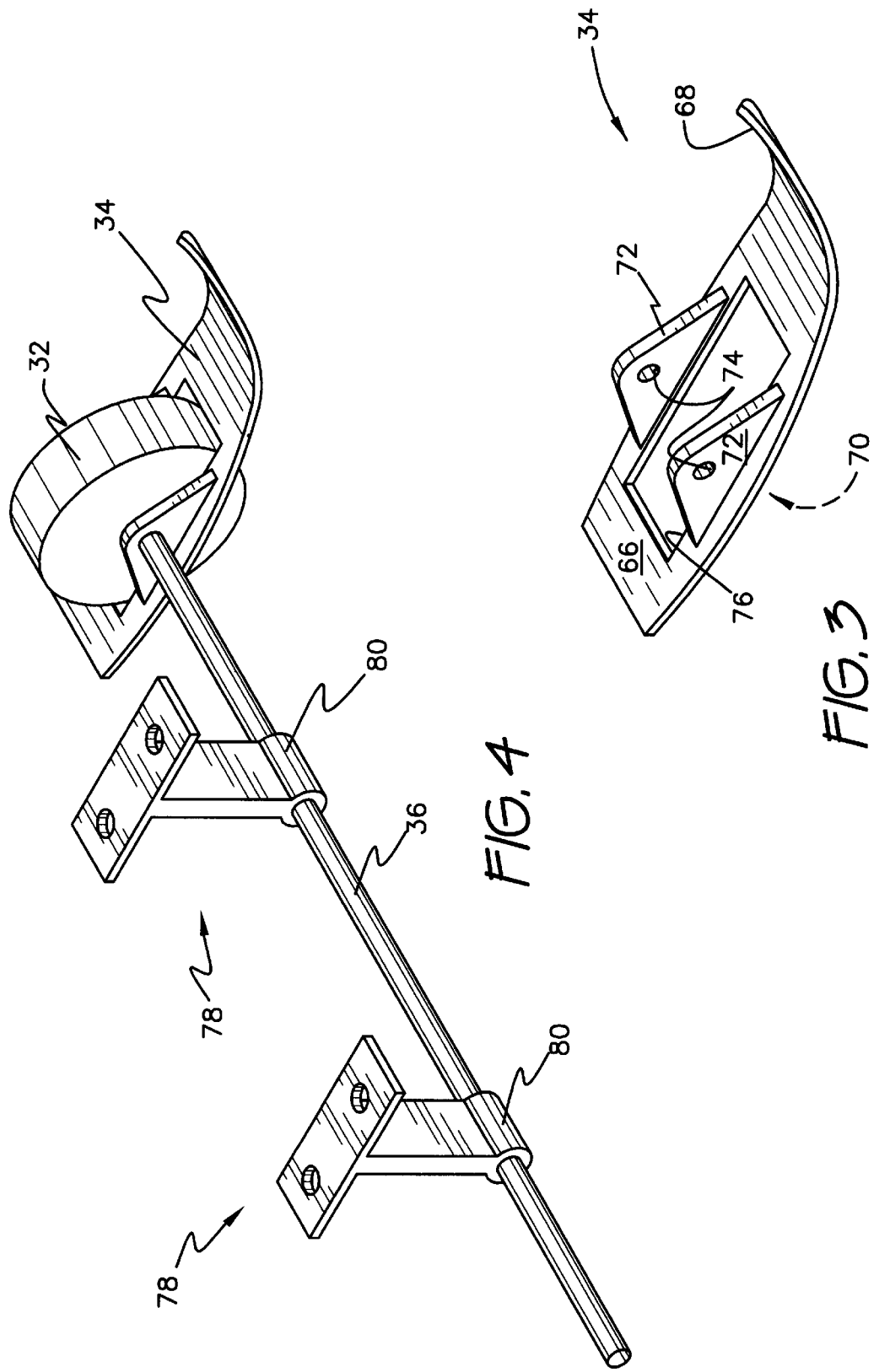

RECREATIONAL WHEELED ACCESSORY CARRIER

BACKGROUND OF THE INVENTION

1. Field of the Invention

The present invention relates to a wheeled carrier for carrying diverse objects. The carrier has a body, wheels, small receptacles mounted on the body, carrying racks projecting from the body, and a handle. The wheels operate with surrounding skids, so that negotiation of sand is practical. The novel carrier is particularly suitable for carrying foods, clothes, bathing and recreational accessories on sandy terrain, such as at beaches and in desert areas. Of course, articles other than recreational materials may be carried. Scientific, photographic, surveying, archeological, geological exploration, and many other types of tools, implements, and materials could be advantageously transported over sandy terrain by the novel carrier.

2. Description of the Prior Art

Transporting diverse articles over sandy terrain can be quite tiresome and time consuming. When beachgoers, hikers, campers, and others engaging in recreational activities at a locale in sandy terrain remotely from their mode of transportation, it is frequently necessary to lug along food, drinks, camping gear, reading materials, and other accessories. General purpose luggage is not highly suitable even for a short trip to a selected camping spot or similar destination, since it must be both grasped and carried above and out of contact with the ground. Wheeled carts are unsuitable for negotiating sandy terrain since wheels are notoriously inefficient in sand. A wagon or cart having wheels as large as six inches in diameter may encounter resistance so great that the wheels do not contribute to mobility.

Wheeled vehicles intended for use at beaches or for carrying a variety of articles including food and other items suitable for picnics and related recreational activities are known. U.S. Pat. No. 5,425,545, issued to Peter J. McCusker on Jun. 20, 1995, illustrates a wheeled cart having a bottom surface designed to slide over sand. The device of McCusker lacks the external storage receptacles, collapsible towing handle, and relatively small skids disposed below and tiltable relative to the principal storage compartment of the present invention. It would be possible in some situations for the device of McCusker to become immobilized on sandy ridges should the wheels become trapped in sand, since the bottom surface of his cart is not tiltable. By contrast, individual skids on the novel cart can swivel about the axis of the associated wheel, thereby accommodating localized irregularities in topography.

U.S. Pat. No. 4,589,668, issued to Edwin H. Mares on May 20, 1986, describes a two wheeled tiltable cart having skis disposed thereon, one ski being disposed to one side of its associated wheel. By contrast with the device of Mares, the present invention has four wheels and four skis, each ski extending on both lateral sides of its associated wheel. Mares also lacks the storage structure of the present invention, a collapsing tow handle, and a collapsible storage rack.

U.S. Pat. No. 4,618,157, issued to Sharon H. Resnick on Oct. 21, 1986, describes a beach cart primarily negotiating sand by skis. Each of the two skis has a wheel disposed at the small, inclined forward section. By contrast, the present invention has wheels disposed at the large horizontal portions of their respective skis. Also, there are four wheels and four skis. Resnick's cart lacks the storage features of the present invention.

U.S. Pat. Nos. 5,285,656, issued to Calvin R. Peters on Feb. 15, 1994, 5,306,029, issued to Ronald R. Kaiser, II on Apr. 26, 1994, 5,407,218, and issued to Steven C. Jackson on Apr. 18, 1995, exemplify wheeled carts having significant enclosed storage, insulated compartments, draw handles, and other amenities for transporting diverse articles. These inventions all lack the combination of storage racks and compartments as well as the combined skids and wheels of the present invention.

U.S. Pat. No. 5,492,347, issued to Ignazio Palmeri et al. on Feb. 20, 1996, describes a two wheeled cart for use in carrying articles on the beach. This device lacks the four combined wheels and skids as well as the many carrying features of the present invention.

None of the above inventions and patents, taken either singly or in combination, is seen to describe the instant invention as claimed.

SUMMARY OF THE INVENTION

The present invention provides a wheeled carrier suitable for carrying the many diverse articles which are typically transported to sites of recreational activities conducted on open, undeveloped, sandy terrain. The novel wheeled carrier has two characteristics making it advantageous for this purpose. One is that each wheel has an associated skid configured generally as a ski. Each skid swivels about the axis of its associated wheel, thereby being able to overcome entrapment in sandy ridges immobilizing a single wheel. The carrier thereby improves on the relatively limited mobility of wheels in negotiating sandy terrain.

The other characteristic is diversity of storage accommodation. In addition to the principal receptacle of the body of the carrier, there are external storage pockets and a collapsible upwardly projecting rack suitable for carrying folding chairs, bicycles, and other awkward gear not sufficiently compact to be readily stored in closed compartments. The principal receptacle and external pockets provide enclosed storage areas of different sizes, thereby enabling organizing carried articles by size or purpose. The principal compartment is sufficiently large to carry a child, and has seat belts for retaining the child. The rack provides open or exposed storage capabilities.

Practicality is further enhanced by a collapsible towing handle. Collapsibility of the handle and rack minimize outward projections from the principal receptacle, thereby rendering the carrier as compact for stowage as is feasible.

Accordingly, it is a principal object of the invention to provide a wheeled carrier suitable for carrying diverse articles on sandy terrain.

It is another object of the invention that a variety of exposed and enclosed storage apparatus be provided.

It is a further object of the invention to enable organization of carried articles by size and purpose.

Still another object of the invention is to improve over the ability of wheels to negotiate irregularities in a sandy surface.

An additional object of the invention is to render the carrier as compact for stowage as is feasible.

It is again an object of the invention to accommodate a child by providing sufficient space and seatbelts.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is a perspective detail view of a component of the invention seen towards the top of FIG. 2.

FIG. 4 is a perspective view of axle support structure partially visible at the lower left of FIG. 1.

DETAILED DESCRIPTION OF THE PREFERRED EMBODIMENTS

Figure 1:
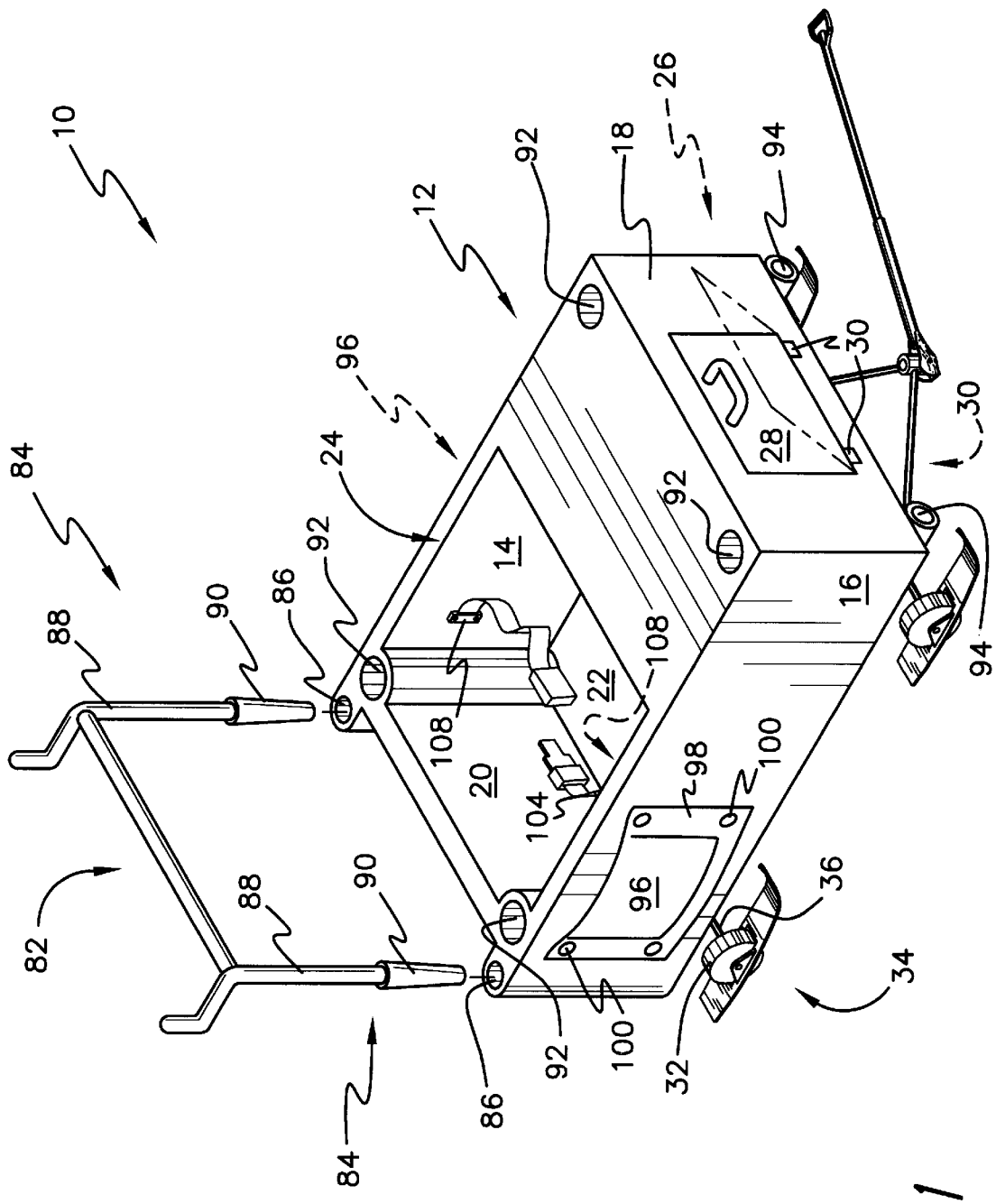
FIG. 1 is an exploded, perspective view of the invention.

Turning now to FIG. 1 of the drawings, wheeled carrier 10 is seen to include a substantially rigid body 12 having lateral walls 14, 16, 18, 20 and a bottom wall 22. Substantially rigid signifies that body 12 will hold its general configuration even when loaded, although some deflection may be experienced responsive to loading, manipulation, and other forces. Walls 14, 16, 18, 20, and 22 define an upwardly open first receptacle 24. Wall 18 is of significant thickness or depth, and forms a second receptacle 26 having a closure 28 engaged and retained by wall 18. Closure 28 may be engaged and retained in any suitable fashion, such as by friction fit, hinges 30, or other structure releasably securing closure 28 to body 12. In the embodiment of FIG. 1, closure 28 is hinged at the top, and may be swung upwardly to the position indicated in broken lines.

Carrier 10 is suitable for negotiating sandy terrain due combining benefits of wheels 32 and skids 34. Preferably, carrier 10 is supported on four wheels 32 and skids 34, one wheel 32 and skid 34 being located at each corner of body 12. As determined by rectangular configuration of bottom wall 22, body 12 of carrier 10 has four corners. Wheels 32 and skids 34 are rotatably supported on common axles 36 or 38 by axle support structure.

Figure 2:
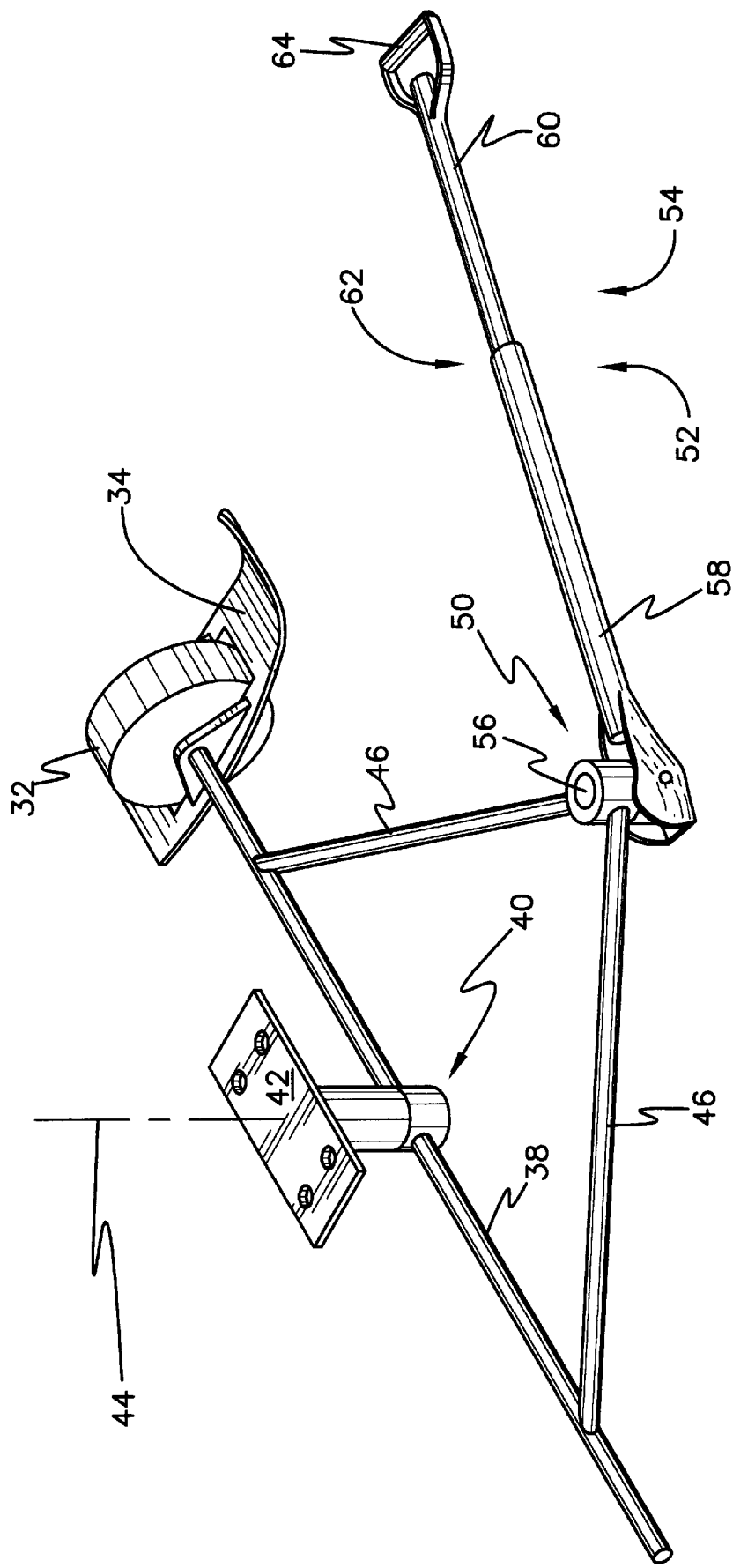
FIG. 2 is a perspective detail view of axle support structure partially visible at the lower right of FIG. 1.

FIG. 2 shows arrangement of front axle 38. Axle 38 is pivotally connected to body 12 by a bearing 40 fixed to attachment plate 42. Attachment plate 42 is fixed to the bottom surface of wall 22 by suitable fasteners (not shown), adhesive (not shown), or in any suitable way. Bearing 40 enables axle 38 to pivot or rotate in a horizontal plane about axis 44. Bearing 40 and plate 42 collectively form axle support structure for axle 38. Two tie rods 46 are connected to axle 38. Tie rods 46 converge at a boss 50 to which a tow arm 52 of handle 54 is pivotally fastened, such as by a pin 56 acting in the capacity of an axle. Tow arm 52 is formed in telescoping sections 58, 60. Sections 58, 60 are releasably fixed to one another by an internal spring loaded pin and hole arrangement 62. Arrangement 62 is well known, comprising a resilient arm (not separately shown) mounted within hollow tubing forming section 58, to which a rounded pin (not separately shown) is fixed. Sections 58, 60 each have holes of similar diameter which, when disposed in alignment, accept passage of the rounded pin. When the rounded pin penetrates both holes, sections 58 and 60 are axially immobilized. When the rounded pin is manually depressed, sections 58 and 60 are freed to collapse in telescoping fashion for stowage. Section 60 terminates in a grip 64 enabling grasping by hand. This construction thus provides a collapsible handle 54 fastened to carrier 10.

FIG. 3 illustrates construction of a typical skid 34 in detail. Skid 34 has a horizontal section 66 and an inclined section 68. Horizontal section 66 and inclined section 68 are configured generally in the manner of skis, combining to provide a downwardly oriented sliding support surface 70 on which carrier 10 is supported should a wheel 32 associated with skid 34 sink into sand (not shown). Trunnion supports 72 each having an opening 74 for accepting passage of axle 38 provide axle engagement apparatus pivotally supporting skid 34 above the lowermost point of its associated wheel 32 and below the uppermost point of associated said wheel 32.

A slot 76 is formed in horizontal section 66. Trunnion supports 72 are dimensioned and configured so that the associated wheel 32 occupies slot 76 such that part of wheel 32 projects above horizontal section 66 part of wheel 32 projects below horizontal section 66. Position of wheels 32 relative to skids 34 is shown in FIG. 1. In the view of FIG. 2, one wheel 32 and an associated skid 34 are shown at larger scale in their operable relative position fixed to axle 38.

Axle support structure for rear axle 36 is shown in detail in FIG. 4. Two support brackets 78 are fixed to the lowermost surface 80 of body 12, and rotatably support axle 36 on body 12. Brackets 78 have bearing members 80 which encircle axle 36, thereby providing axle engagement apparatus for rear axle 36. One wheel 32 and its associated skid 34 are shown mounted on axle 36, the other wheel and skid which would ordinarily be mounted on the exposed end of axle 36 shown at the lower left of FIG. 4 being omitted for clarity of the view.

Returning to FIG. 1, the many storage and carrying features of carrier 10 will be described. In addition to receptacles 24 and 26, carrier 10 has a telescoping storage rack 82. Rack 82 has two vertical support shafts 84 which fit into sockets 86 formed in walls 14, 16, and 20 of body 12, rack 82 thereby projecting from and supported by body 12, for supporting irregularly configured articles (not shown), such as bicycles, chairs, and others. Shafts 84 are formed in telescoping upper and lower support rods 88, 90. Support rods 88, 90 preferably releasably lock together in the manner described prior concerning handle 54.

Several dedicated or specialized holders are provided. An upwardly oriented frustoconical opening 92 for holding a drinking cup is located at each of the four corners of body 12. A plurality of tubular holders each having an elongated opening 94 is formed by and disposed upon body 12, for holding newspapers, magazines, and other rolled webs. External pockets 96 each formed from flexible material such as a cloth fabric or a flexible synthetic resin are fixed to the exterior of body 12. Pockets 96 have flanges 98 enabling fasteners 100 or, alternatively, adhesive or hook and loop material (not shown) to be applied to pockets 96.

Receptacle 24 preferably has a safety seat belt 102 fixed to body 12, for retaining a child in said first receptacle. Seat belt 102 may be conventional, having two sections 104, 106 each anchored to one wall 14 or 16 of body 12 by suitable mounting plates 108.

It is to be understood that the present invention is not limited to the embodiments described above, but encompasses any and all embodiments within the scope of the following claims.

We claim:

1. A wheeled carrier for negotiating sandy terrain, comprising:

a substantially rigid body having lateral walls, a bottom wall, and an upwardly oriented first receptacle defined within said lateral walls and said bottom wall;

axle support structure projecting downwardly from said body, said axle support structure supporting an axle and a plurality of wheels thereon below said bottom wall of said body, said wheels being rotatably supported on said axle, at least one said wheel having an associated skid including a horizontal section and an inclined section, said horizontal section having a downwardly oriented sliding support surface, axle engagement apparatus pivotally supporting said skid above the lowermost point of its associated said wheel and below the uppermost point of its associated said wheel, and a slot formed in said horizontal section, said at least one wheel associated with said skid disposed to occupy said slot such that part of said wheel projects above said horizontal section of said skid and part of said wheel projects below said horizontal section of said skid.

2. The wheeled carrier according to claim 1, said wheeled carrier having four wheels and four skids, said bottom wall being rectangular and having four corners, one said wheel and one said skid disposed at each said corner.

3. The wheeled carrier according to claim 1, further comprising a storage rack projecting from and supported by said body, for supporting irregularly configured articles.

4. The wheeled carrier according to claim 3, said rack comprising telescoping support rods.

5. The wheeled carrier according to claim 1, said body forming a second receptacle having a closure disposed to engage and be retained by a said lateral wall of said body.

6. The wheeled carrier according to claim 1, said body comprising at least one upwardly oriented frustoconical opening, for holding drinking cups.

7. The wheeled carrier according to claim 1, further comprising at least one elongated opening formed by and disposed upon said body, for holding rolled webs.

8. The wheeled carrier according to claim 1, further comprising a collapsible handle fastened to said wheeled carrier.

9. The wheeled carrier according to claim 1, further comprising at least one external pocket formed from flexible material and fixed to the exterior of said body.

10. The wheeled carrier according to claim 1, further comprising a safety seat belt fixed to said body and disposed within said first receptacle, for retaining a child in said first receptacle.

11. A wheeled carrier for negotiating sandy terrain, comprising:

a substantially rigid body having lateral walls, a rectangular bottom wall, four corners, an upwardly oriented first receptacle defined within said lateral walls and said bottom wall, and said body having a second receptacle having a closure disposed to engage and be retained by a said lateral wall of said body, at least one upwardly oriented frustoconical opening, for holding drinking cups, at least one elongated opening formed by and disposed upon said body, for holding rolled webs, and at least one external pocket formed from flexible material and fixed to the exterior of said body, said first receptacle having a safety seat belt fixed to said body and disposed within said first receptacle, for retaining a child in said first receptacle;

axle support structure projecting downwardly from said body, said axle support structure supporting two axles and four wheels thereon below said bottom wall of said body, said wheels being rotatably supported on said axle, each said wheel located at one said corner of said body, each said wheel having an associated skid including a horizontal section and an inclined section, said horizontal section having a downwardly oriented sliding support surface, axle engagement apparatus pivotally supporting said skid above the lowermost point of its associated said wheel and below the uppermost point of its associated said wheel, and a slot formed in said horizontal section, said at least one wheel associated with said skid disposed to occupy said slot such that part of said wheel projects above said horizontal section of said skid and part of said wheel projects below said horizontal section of said skid;

a storage rack projecting from and supported by said body, for supporting irregularly configured articles, said rack comprising telescoping support rods; and a collapsible handle fastened to said wheeled carrier.

* * * * *